UNITED STATES PATENT OFFICE.

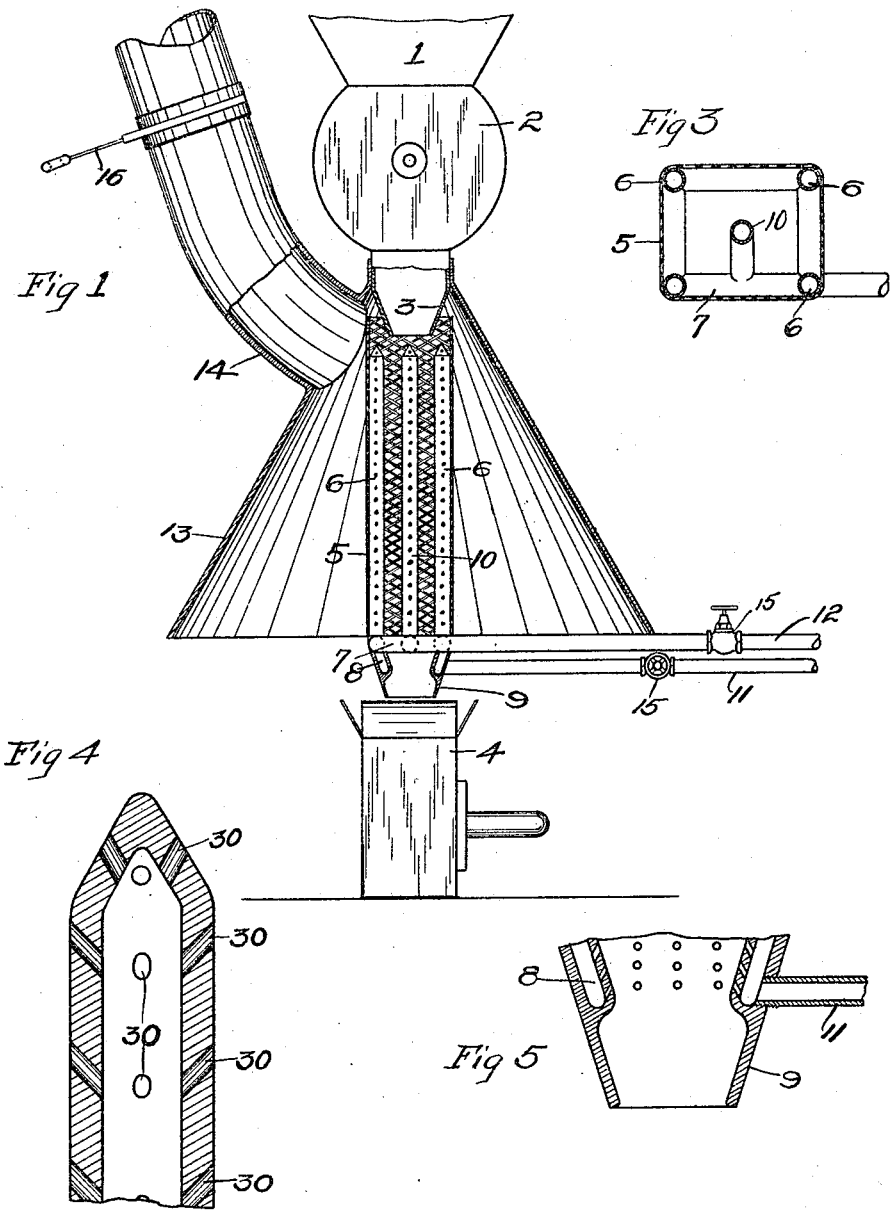

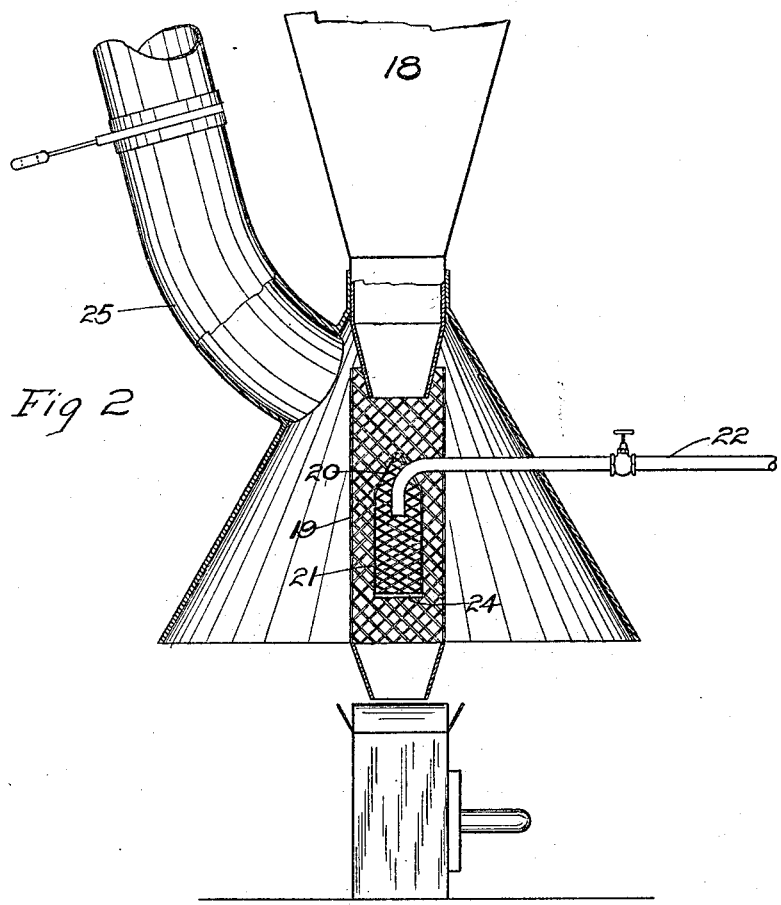

ADOLPH W. H. LENDERS, OF CEDAR RAPIDS, IOWA.

METHOD OF PRODUCING DUSTLESS STARCH.

1,272,682.  Specification of Letters Patent.  Patented July 16, 1918.

Application filed March 30, 1914. Serial No. 828,414.

*To all whom it may concern:*

Be it known that I, ADOLPH W. H. LENDERS, a citizen of the United States, residing at Cedar Rapids, in the county of Linn and State of Iowa, have made a discovery of a Method of Producing Dustless Starch, of which the following is a specification.

An examination of the contents of the packages of lump starch now on the market, discloses the fact that there is a considerable percentage of dust in the said packages and that the surfaces of the lumps of starch are covered with adhering powder or dust.

My invention has for its object to provide a process which when followed will free the lumps of starch from this adhering dust, and I here desire to state that the word "lump", as used by me throughout this specification and the appended claim is intended to cover the various kinds of starch, whether known to the trade as lump, crystal, granulated, pearl or fine lump, and when the term is so used, shall be deemed to apply to any or all kinds and sizes of starch.

When I refer to "dust", I desire to be understood as using the term to define or describe the almost impalpable particles of of starch called variously starch dust or powder.

In the drawings which are hereunto annexed and are a part of this specification, I have illustrated an apparatus which can be employed to carry out my newly discovered process, but these drawings are furnished solely for illustrative purposes, and are only intended to enable persons skilled in the art to construct apparatus which will present a concrete embodiment of my process, and I am to be understood as not in any manner or form limiting myself to the construction or details as shown and described, as it will be apparent to anyone who is familiar with the art that innumerable changes may be made in the mechanical construction, and I intend to be limited in fact only by the hereinafter contained claim, in which:

Figure 1, is a fragmentary detail view partly in section and partly in elevation of a part of a starch filling and weighing machine, which is equipped with apparatus for carrying out my newly discovered process.

Fig. 2, is a view partly in section and partly in elevation of a suitable form of apparatus where the smaller lumps are being filled.

Figs. 3, 4, and 5, are enlarged detail views of part of the apparatus.

Similar reference numerals refer to similar parts throughout the entire description.

In filling and weighing machines for filling the carton with starch such as are now on the market, it is customary to have two discharge hoppers, one for the larger or coarser lumps, and the other, which is arranged in connection with the weighing mechanism for handling the finer lumps.

The hopper which fills the carton with the larger lumps has in it a plurality of rotatable blades or knives for ejecting the starch from the hopper, and which also serves to break up the larger lumps into more suitable sizes for the carton. This operation, however, increases the amount of powder which is necessarily present where the starch is traveling through a plurality of feeding devices, and in fact, it does not matter how clean the starch may be when it approaches this device, when examined after its discharge from the hopper orifice, it will be found to contain a considerable percentage of dust, and the surfaces of the lumps will be found to be thickly covered with an adhering starch dust.

Now it is well known to persons skilled in the art that starch in the process of curing forms crystals, and when broken up assumes various crystalline shapes, but when these crystals are all coated with dust, they lose the appearance which is so desirable.

I have discovered that if the lumps in their travel from the discharge orifice of the hopper to the carton are subjected to a blast or spray of compressed air that the adhering powder can be blown from the surfaces of the lumps, and if a suction is provided, the dust laden air can be drawn off to a separating chamber and the surface of the lumps of starch will be free from adhering starch dust while the carton when filled will be free from starch dust.

This is an extremely desirable feature, practice having shown that a dustless starch will sell much more readily than one which has a percentage of dust present therein and where the surface of the lumps are covered with the adhering dust.

As shown in the drawings, 1 indicates the hopper, having a cylinder 2, in which the blades or knives are maintained. The discharge orifice 3, is located above the carton 4. Intermediate the discharge orifice 3, and the carton 4, is located my improved apparatus for getting rid of the dust. As shown in the drawings, it consists of a rectangular structure, the walls 5, of which are formed of screen or foraminated material; in the corners of the walls are located pipes 6. These pipes extend to a point adjacent the top of the screen 5, and are in communication with a tubular member 7, which encircles the screen 5, adjacent the bottom thereof.

Below the tubular member 7, the walls are hollow forming a jacket 8, which tapers inwardly to a delivery spout 9, which is of the size suitable for the carton which is to be filled. The inner wall of the jacket 8, is provided with a plurality of perforations which direct the air upwardly. This jacket is suitably connected to a pipe 11, leading to a source of compressed air. A pipe 10, is shown located in the center of the chamber formed by the screen walls 5, and is connected to the tubular member 7, which is connected to a pipe 12, which is also connected to a suitable source of compressed air supply. A conoidal structure 13, depends downwardly from the discharge hopper 3, its upper end being secured adjacent the cylinder 2. The walls of this structure flare downwardly and outwardly and terminate in a plane adjacent the tubular structure 7.

An opening is provided in the said conoidal structure 13, near its upper end, and a pipe 14, is connected thereto which leads to an exhaust fan (not shown) which is designed to produce a suction for drawing the dust laden air from the interior of the cone 13.

The operation of the process is as follows:

The valves 15, in the pipes 11 and 12, are opened; the air passing up through the pipes 6, and 10, is discharged therefrom through a plurality of minute perforations 30, which results in producing a number of fine jets or sprays of air. These jets being directed in various directions, render it quite impossible for a lump of starch to pass the pipes without being subjected to a blast of air a number of times, which has the effect of blowing the powder or dust from the surface of the lump, it being driven out through the screen walls 5, the screen serving to prevent the lumps from being driven outwardly.

The damper 16, in the suction pipe 14, is then opened and the dust laden air is sucked out of the interior of the cone whence it may be delivered to a separating chamber of the usual construction for this purpose. The result of this operation is that the lumps when delivered to the carton are entirely free from the adhering starch dust as there is a zone adjacent the lower part of the chamber through which the starch passes, which is entirely free from starch dust or flour. Fig. 2, shows a preferred form for handling the finer lumps in which, as shown, this consists of a cylinder 19, the wall of which is formed of screen or other suitable foraminated sheet of metal which has mounted in its center a conoidal shaped structure 20, having vertical cylindrical walls 21, depending downwardly from the lower edge of the cone.

A pipe 22, which is connected to a suitable source of compressed air supply enters the conoidal structure 20, at the top, and is adapted to discharge the air in the interior of the said structure. The air issuing from the pipe, strikes the bottom 24 of the conoidal structure 20. This bottom is made solid and diverts the direction of the air current so that it passes out radially through the foraminations in the walls 21. The downwardly moving starch passes through the annular space surrounding the conoidal structure 20, its course of travel being directed by means of the shape of the said structure and it necessarily passes through the current of air which is passing radially from the cylindrical walls 21. The foraminations in the walls of the outer cylinder are of such size as to permit the escape of the dust, but are small enough to prevent the discharge of the fine lump or pearl. A structure similar to the cone used in the first filling hopper is placed about the outer cylindrical walls and is provided with a pipe 25, which is connected by a pipe to the pipe 14, leading to the exhaust fan.

Although I have described my newly discovered process as being used in connection with packing lump starch, it will be apparent from the foregoing description that the process can be employed in the packing of any granular substance which it is desired to have freed from dust when received in the carton.

Having described my invention what I regard as new and desire to obtain by Letters Patent is:

The process of cleaning a product of very friable material which consists of conducting said very friable material through a relatively short unobstructed chamber, subjecting the material in its vertical passage to a series of jets of air at various angles, and maintaining a current of air away from the field of said jets and away from the region of delivery to a receptacle.

In testimony whereof, I have signed the foregoing specification.

ADOLPH W. H. LENDERS.

Witnesses:
A. M. DOUGLAS,
R. W. BLACK.